Patented June 16, 1936

2,044,562

UNITED STATES PATENT OFFICE 2,044,562

PROCESS FOR THE MANUFACTURE OF TRIPHENYL-METHANE DYESTUFFS

Paul W. Carleton, Pennsgrove, N. J., assignor to E. I. du Pont de Nemours & Company, Wilmington, Del., a corporation of Delaware No Drawing. Application October 30, 1934, Serial No. 750,737

5 Claims. (Cl. 260—68)

This invention relates to the manufacture of triphenyl-methane dyestuffs. More particularly, this invention deals with an improved process of preparing the triphenyl-methane dyestuff known under the trade name of Pontacyl green NV. This dyestuff is listed in the Colour Index under No. 735, and is described there as corresponding to the following formula:

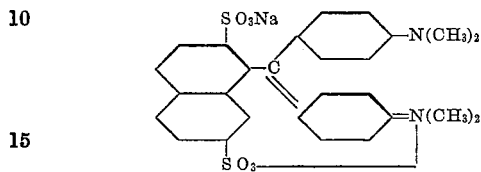

Its correct chemical name is the sodium salt of tetramethyl-diamino-diphenyl-$\alpha$-naphthyl-carbinol disulphonic acid anhydride. But for brevity it will be referred to hereinafter by its trade name, namely Pontacyl green NV.

This dyestuff is generally manufactured in the art by condensing tetramethyl-diamino-benzhydrol with naphthalene-2,7-disulphonic acid and oxidizing the resulting leuco compound by the aid of lead peroxide and acid. The practice in the art with regard to the oxidation step is illustrated in German Patents 108,129 and 110,086 (Friedlander V, 196 and 199). This practice consisted of dissolving the sodium salt of the leuco base in water, adding the requisite quantity of acid, and then stirring-in an aqueous suspension of lead superoxide.

The yield, however, by this method is not very satisfactory, and the cost of lead superoxide is rather high as compared with the more common alkali-metal bichromates.

It is an object of this invention to improve the oxidation process whereby to improve the yield of the product and to obtain a dyestuff of better purity and uniformity. It is a further object of this invention to modify the process of oxidation whereby to enable one to use chromic acid or metal chromates or bichromates as oxidizing agent. Other objects of the invention will appear as the description proceeds.

According to my invention, these objects are accomplished by conducting the oxidation step substantially along the following lines, namely: a definite quantity of the leuco base is first dissolved in aqueous alkali to which is also added a suitable chromate or bichromate. A quantity of acid, equal to that theoretically necessary for the oxidation or in excess thereof is then added at once and stirred very rapidly to effect the oxidation in a minimum of time.

It is to be noted that in my process the order of addition of acid and oxidizing agent is reversed, and that the acid is dropped in suddenly, or at any rate, as rapidly as the apparatus and quantities involved will permit. The quantity of acid added may be varied within wide limits, but the rate of addition should be as high as possible.

I found that by this method of procedure a superior product is obtained, and in larger yield, than by heretofore used methods. The effect is quite surprising, and is of high practical value.

Without limiting my invention to any particular details, the following example is given to illustrate my preferred mode of operation. Parts mentioned are by weight.

Example 90 parts leuco base of Pontacyl green NV is dissolved in 1,000 parts water with sufficient caustic soda to make the solution just alkaline after dissolving all the leuco. 20 parts of sodium dichromate dissolved in 200 parts water are then added. The temperature is adjusted to 15–20° centigrade. Then, with excellent agitation, there is added all at once a solution of 58 parts oxalic acid in 500 parts of water.

The agitation is continued for 20 minutes. The mass is heated to 60° centigrade, and filtered to remove a small amount of insoluble. It is then salted to 25% with sodium chloride, and agitated until the dyestuff has crystallized. The dyestuff is isolated by the usual filtration, and dried.

The leuco base forming the initial material in this procedure may be prepared by condensing, for example, tetra-ethyl-diamino-benzhydrol with naphthalene-2,7-disulfonic acid in strong sulfuric acid, diluting with water, and filtering off the product.

It will be understood that the above example is merely illustrative and may be subjected to considerable variation without departing from the spirit of this invention.

Thus, to dissolve the leuco base, alkalies other than caustic may be used.

In place of sodium dichromate may be used chromic acid or any of its water-soluble salts (including both chromates and dichromates). In case chromic acid is used, alkali should be added if necessary on mixing with the leuco solution to make sure that the leuco base is completely dissolved.

The temperature may be varied widely, as may also the concentrations of the solutions involved at all stages. It is merely necessary to insure that both the acid and the leuco-chromate mixture be completely dissolved.

Many other variations and modifications are permissible, as will be readily understood by those skilled in the art.

The advantages of my novel method are that the oxidizing agent employed is cheaper, and that the product obtained is of greater tinctorial value and more uniform in composition than when prepared by the methods of the prior art.

I claim:

1. In the process of oxidizing the leuco base of tetraalkyl-diamino-diphenyl-naphthyl-methane-disulfonic acid by the aid of oxalic acid and an oxidizing agent to produce the corresponding dyestuff, the improvement which comprises mixing the leuco base and oxidizing agent first, and then adding the oxalic acid at a very high rate.

2. A process for producing the dyestuff known as Pontacyl green NV, which comprises dissolving the leuco base of said dyestuff in water containing alkali, adding a neutral solution of an oxidizing agent containing a chromate, and then dropping in oxalic acid at a high rate of speed, whereby to oxidize the leuco base before the greater portion of it has precipitated in the free-acid unoxidized form.

3. A process for producing the dyestuff known as Pontacyl green NV, which comprises forming a solution of an alkali-metal salt of the leuco base of said dyestuff, adding an aqueous solution of an alkali-metal bichromate in sufficient quantity to oxidize the entire leuco base to the final dyestuff, and then dropping-in all at once the entire quantity of acid requisite to liberate the theoretical quantity of oxygen from the bichromate, the acid employed being of a strength corresponding to that of oxalic.

4. A process as in claim 3, the acid added being oxalic acid.

5. The process of producing a dyestuff, which comprises dissolving substantially 90 parts of the leuco base of Pontacyl green NV in 1,000 parts of water containing sufficient caustic soda to dissolve the entire leuco mass, adding substantially 20 parts of sodium dichromate dissolved in water, adjusting the temperature to about 15 to 20° C., adding all at once an aqueous solution of 50 parts of oxalic acid with rapid agitation, heating the mass to about 60° C., separating any impurities formed, and salting out the formed dyestuff.

PAUL W. CARLETON.